US006611545B2

(12) United States Patent  (10) Patent No.: US 6,611,545 B2
Cabaret et al.  (45) Date of Patent: Aug. 26, 2003

(54) ACTIVE ELEMENT FOR A LASER SOURCE AND LASER SOURCE COMPRISING SUCH AN ACTIVE ELEMENT

(75) Inventors: Louis Cabaret, Plessis St Benoist (FR); Jean-Eucher Montagne, Orleans (FR)

(73) Assignee: Compagnie Industrielle des Lasers Cilas, Marcoussis (FR)

( * ) Notice: Subject to any disclaimer, the term of this patent is extended or adjusted under 35 U.S.C. 154(b) by 230 days.

(21) Appl. No.: 09/752,436

(22) Filed: Jan. 3, 2001

(65) Prior Publication Data

US 2001/0019570 A1 Sep. 6, 2001

(30) Foreign Application Priority Data

Jan. 6, 2000 (FR) ............................................. 00 00128

(51) Int. Cl.$^7$ ................................................. H01S 3/06
(52) U.S. Cl. ........................... 372/66; 372/33; 372/36; 372/106; 331/94; 334/94.5; 359/333; 606/13
(58) Field of Search ............................ 372/36, 66, 33, 372/106; 331/94; 334/94.5; 359/333; 606/13

(56) References Cited

U.S. PATENT DOCUMENTS

| | | | | |
|---|---|---|---|---|
| 3,660,779 A | * | 5/1972 | Cuff et al. ............... | 334/94.5 |
| 4,088,964 A | * | 5/1978 | Clow ......................... | 331/94 |
| 4,756,002 A | | 7/1988 | Ruggigre et al. | |
| 4,935,932 A | * | 6/1990 | Johnson et al. .......... | 372/33 |
| 5,001,718 A | * | 3/1991 | Burrows et al. .......... | 372/33 |
| 5,048,026 A | | 9/1991 | Shaw et al. | |
| 5,868,731 A | * | 2/1999 | Budnik et al. ............. | 606/13 |
| 5,872,804 A | * | 2/1999 | Kan et al. ................. | 372/106 |
| 5,974,061 A | | 10/1999 | Byren et al. | |
| 6,061,377 A | * | 5/2000 | Brassart et al. .......... | 372/36 |
| 6,144,484 A | * | 11/2000 | Marshall ................... | 359/333 |

FOREIGN PATENT DOCUMENTS

| | | |
|---|---|---|
| EP | 0377207 | 7/1990 |
| EP | 0404635 | 12/1990 |
| EP | 0902511 | 3/1999 |
| FR | 2303397 | 10/1976 |

OTHER PUBLICATIONS

French Search Report dated Aug. 31, 2000.
Patent Abstract of Japan vol. 1996 No. 4, Apr. 30, 1996 & JP 07 321394 A (NEC CORP), Dec. 8, 1995.
Patent Abstract of Japan vol. 017, No. 378 Jul. 15, 1993 & JP 05 063263 A (Hoya Corp), March 12, 1993.

* cited by examiner

*Primary Examiner*—Paul Ip
*Assistant Examiner*—Tuan M Nguyen
(74) *Attorney, Agent, or Firm*—Stevens, Davis, Miller & Mosher, LLP (57) ABSTRACT

Active element for a laser source and laser source comprising such an active element.

According to the invention, the active element for a laser source comprises an elongate rod comprising a doped matrix capable of absorbing a pump beam in order to amplify laser radiation propagating longitudinally, at least one input face for the pump beam, a first reflection face for the pump beam which is inclined with respect to the longitudinal axis of the rod and at least one interacting second reflection face, at least one of the input face and second reflection face being equally inclined.

17 Claims, 8 Drawing Sheets

ACTIVE ELEMENT FOR A LASER SOURCE AND LASER SOURCE COMPRISING SUCH AN ACTIVE ELEMENT

BACKGROUND OF THE INVENTION

The present invention relates to an active element for a laser source, and to a laser source comprising such an active element.

DESCRIPTION OF THE PRIOR ART

In a known manner, such a laser source generally comprises:

an active element comprising an elongate rod, generally, but not exclusively, of circular cross section, including a doped matrix capable of absorbing a pump beam in order to amplify laser radiation propagating longitudinally with or without reflection; and at least one pump source, for example a laser diode, capable of emitting a pump beam into said rod.

In a known manner, said pump beam may be emitted:

either longitudinally with respect to the axis of said elongate rod. In this case, the cylindrically shaped rod is used directly as a lightguide, either by generating a total reflection on the walls of the cylinder, or by arranging a reflector outside the walls in order to limit the amplification of the spontaneous emission;

or transversely to the axis of said rod, as described for example in documents EP-0 377 207 and U.S. Pat. No. 4,756,002.

It is known that one of the main restrictions, with regard to pumping an amplifying medium (rod) with a pump source, is connected with the amplitude of the wavelength drift, which has to be accepted, while keeping parameters constant over the emitted laser beam. This restriction means that it is necessary, whatever the temperature, to maintain:

a maximum absorption rate (and/or to increase the distance of the active medium though which the pump beam passes); and a transverse homogeneity of the optimum pumping.

In order to satisfy these restrictions, it is known that a rod of rectangular cross section is generally more suitable than a rod of circular cross section, in particular since it allows thermo-optical distortions to be offset. Furthermore, the pumping distance may be increased by placing a reflector on the face opposite the input face of the pump beam.

However, even in this case, with a double pass of the pump beam, the distance of the amplifying medium through which the pump beam passes is generally still much too short to accept drifts in wavelength from the pump source, when it is not temperature regulated.

SUMMARY OF THE INVENTION

The object of the present invention is to remedy these drawbacks. The invention relates to an active element for a laser source, enabling a pump beam to pass homogeneously through the amplifying medium, over an increasing and controllable distance.

For this purpose, according to the invention, said active element for a laser source comprises an optical block which includes:

an elongate rod, which comprises a doped matrix capable of absorbing a pump beam in order to amplify laser radiation propagating longitudinally, and which is incorporated into said optical block;

at least one input face for the pump beam;

a first reflection face for the pump beam which is inclined with respect to the longitudinal axis of said rod; and at least one second reflection face which interacts with said first reflection face, is remarkable in that said input face is inclined with respect to the longitudinal axis of said rod.

Thus, by virtue of the multiple reflections capable of being made on said interacting reflection faces and by the oblique transmission of the pump beam, obtained by the inclination of said inclined faces, said pump beam can pass through the amplifying medium (i.e. said rod) over an increased distance, which enables the aforementioned drawbacks to be remedied. This distance may be controlled, especially by choosing suitable inclination angles, with respect to the longitudinal axis of the rod.

Furthermore, by a suitable choice of said inclination angles, the transverse pumping can also be made homogeneous.

Note that the prior documents EP-0 404 635 and U.S. Pat. No. 5,048,026 describe active elements for a laser source having a structure close to that of the active element in accordance with the present invention. However, these known active elements do not have an input face which is inclined with respect to the longitudinal axis of the rod, such that the distance traveled through the amplifying medium passes cannot be controlled, the pumping cannot be transversely homogenized and the return of the pump beam cannot be accurately adjusted.

In one preferred embodiment of the active element in accordance with the present invention, said rod has a rectangular, for example square, cross section, and said optical block comprises at least one first optical element which is made from a material having substantially the same optical index as the matrix of said rod, which is fixed to a first face of said rod and which has at least one face inclined with respect to the longitudinal axis of said rod, and said first inclined reflection face is formed on said inclined face of said first optical element.

In this case, in a first variant, said optical block further comprises a second optical element which is made from a material having substantially the same optical index as the matrix of said rod, which is fixed to a second face of said rod and which has at least one face inclined with respect to the longitudinal axis of said rod, and the second reflection face is formed on said inclined face of said second optical element.

In this case, preferably, said first and second optical elements are identical and are symmetrically fixed to said rod, which especially enables the homogenization of the pumping to be made easier.

Moreover, in a second variant, said second reflection face is directly formed on one face of said rod.

In addition, according to the invention, said reflection faces are:

either flat;

or rounded.

In the latter case, preferably, each of said reflection faces forms a part of a conical surface of a first conical section of an optical element.

Moreover, advantageously, said optical element comprises a second conical section, said first and second conical sections coaxially surround said rod and are made from a material having substantially the same optical index as the matrix of said rod, and the conical surface of said second conical section comprises said input face of said optical block.

In addition, advantageously, said input face is provided with an antireflection coating.

Moreover, advantageously, at least one of said optical elements:

- is doped, preferably differently to the rod, in particular in order to control any undesirable phenomena; and/or
- is made from at least one of the following materials: yttrium aluminum garnet, vanadate, glass or sapphire; and/or
- is fixed by diffusion bonding to said rod. The separate production of the rod and of the optical elements means they can be machined in a simple manner, thus facilitating the production of said active element for a laser source.

In addition, each of said optical elements can be fixed to one rod face, preferably in the aforementioned manner:

- either directly;
- or indirectly, for example in a particular embodiment where the active element includes a flow of coolant between one face of the rod and the opposite face of an optical element.

The present invention also relates to a laser source of the type comprising:

- an active element for a laser source; and
- at least one pump source capable of emitting a pump beam into said active element.

According to the invention, said laser source is noteworthy in that said active element is such as that mentioned above.

In addition, advantageously, the pump source has an emission surface for the pump beam, the width of which is smaller, by a predefined margin, than the width of said input face of the active element.

BRIEF DESCRIPTION OF THE DRAWING

The figures of the appended drawing will make it easy to understand how the invention can be realised. In these figures, identical reference numbers denote similar elements.

DESCRIPTION OF THE PREFERRED EMBODIMENT

Figure 1:
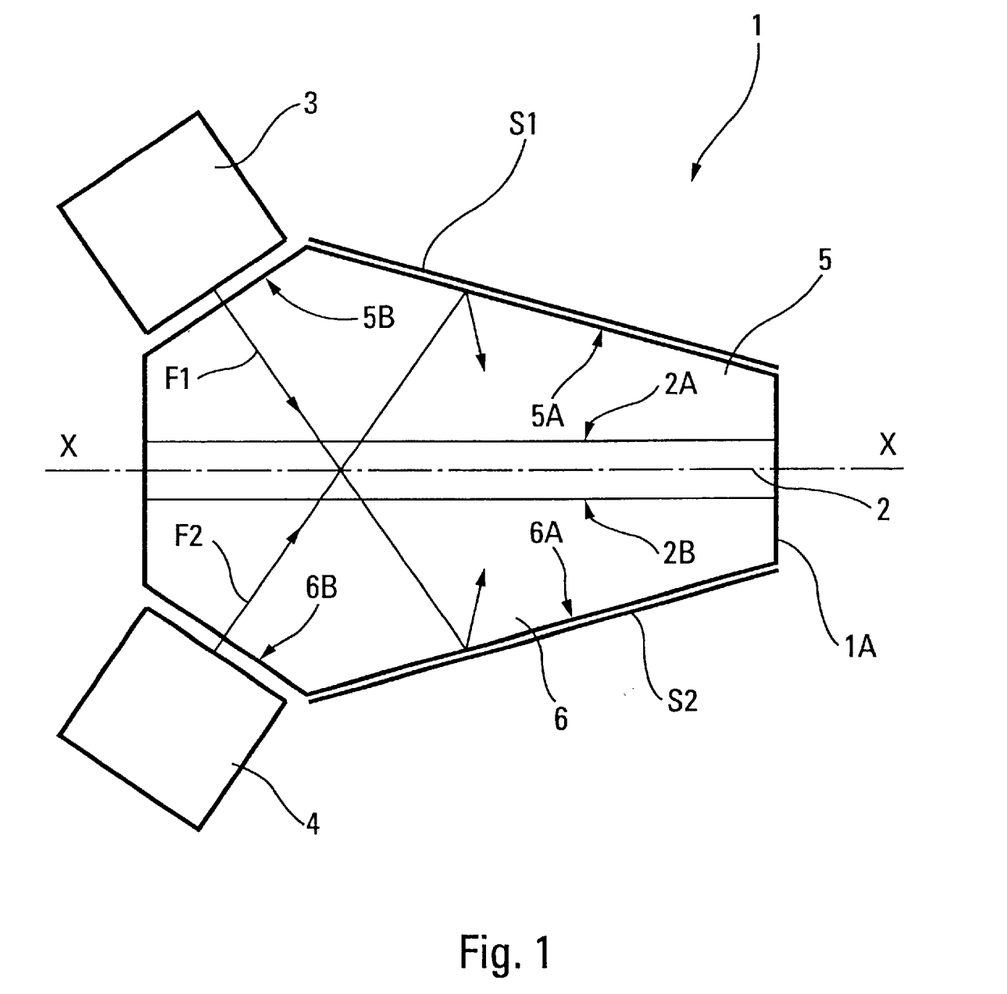
FIG. 1 illustrates schematically a laser source according to a first embodiment of the invention.

The laser source 1 in accordance with the invention and shown schematically in a first preferred embodiment in FIG. 1, comprises in a known manner:

- an active element 1A for a laser source, which includes an elongate rod 2, of longitudinal X—X axis and of rectangular, for example square, cross section. Said rod 2 of the usual type comprises a doped matrix capable of absorbing a pump beam in order to amplify laser radiation propagating longitudinally; and
- pump sources 3, 4, preferably laser diodes, which are capable of emitting pump beams F1, F2 intended to enter said rod 2 and to pass through the amplifying medium formed by the latter.

According to the invention, said active element 1A, which is made in the form of an optical block, comprises in addition,:

- optical elements 5 and 6 which are made from the same material mentioned above as the matrix of the rod 2 or at the very least from a material having substantially the same optical index as said matrix, which are fixed respectively to faces 2A and 2B of said rod 2 and each of which has at least one input face 5B, 6B for the pump beam F1, F2, which is inclined with respect to the longitudinal X—X axis of the rod 2,; and
- at least two reflection faces S1 and S2, at least one of which is inclined with respect to the X—X axis, with an inclination opposite to that of the input faces 5B, 6B.

In the embodiment shown in FIG. 1, said reflection faces S1 and S2 are formed respectively on inclined faces 5A and 6A of the optical elements 5 and 6 such that these two reflection faces S1 and S2 are inclined with respect to the X—X axis.

Furthermore, the optical elements 5 and 6 are identical and are arranged symmetrically with respect to said X—X axis such that the reflection faces S1 and S2 have the same inclination with respect to the X—X axis.

It is however also envisageable within the scope of the present invention:

- to produce reflection faces having different inclinations with respect to the X—X axis; and
- to form one of the reflection faces on one of the faces 2A and 2B of the rod 2, which are parallel to the X—X axis such that only one of said reflection faces is then inclined.

Thus, by virtue of the invention, the pump beams F1 and F2 undergo a plurality of reflections, i.e. total reflections, successively and alternatively on the faces S1 and S2 and passing through the rod 2 after each reflection. Furthermore, since each pass of the rod 2 is oblique, it is longer than a transverse pass.

Consequently, the present invention enables the pass distance through the amplifying medium to be increased.

Furthermore, by a suitable choice of inclination angles of the input faces 5B, 6B (and therefore of the pump beams F1 and F2 emitted orthogonally to these input faces 5B, 6B) and of the reflection faces S1 and S2, it is possible, as specified below:

- to control the pass distance through the amplifying medium; and
- to homogenize the pumping in a transverse direction;

whatever the temperature.

The input faces 5B and 6B of said optical block 1A are preferably provided with antireflection coatings.

Within the scope of the present invention, the active element or optical block 1A can be made in a single piece. However, preferably, each optical element 5, 6 of said optical block is polished in order to produce diffusion bonding of the usual type on the corresponding face 2A, 2B of the rod 2, before continuing to other machining of the optical block.

Furthermore, according to the invention:

the material of the optical elements 5, 6 and of the matrix of the rod 2 is yttrium aluminum garnet, vanadate, glass or sapphire; and each rod 2 is doped with one of the following ion types: neodymium, erbium, holmium or chromium.

Generally, the optical elements 5, 6, which are made from the same material or from a material having substantially the same optical index as the matrix of the rod in order to avoid optical perturbations, are not doped.

However, in one particular embodiment, provision can be made for a specific doping, in particular in order to control possible undesirable phenomena.

Moreover, in a particular embodiment (not shown), the optical source comprises more than two optical elements, preferably four optical elements provided on the four faces respectively of the rod 2 with a rectangular cross section. This makes it possible, in particular, to increase the number of pump sources.

In addition to the aforementioned advantages, the laser source 1 in accordance with the present invention has many other advantages. In particular:

there is no loss in the pump beam;

no coupling optics are needed between the pump sources 3, 4 and the optical elements 5, 6;

normal pump sources (standard commercial diodes) can be used;

a robust laser source 1 is obtained, which only needs minimum adjustments; and the invention may be applied to the majority of existing laser configurations, namely oscillator, amplifier, low power and high power, series mounted, direct pass or multiple pass.

The various geometric aspects encountered in the implementation of the present invention will now be specified.

Figure 2:
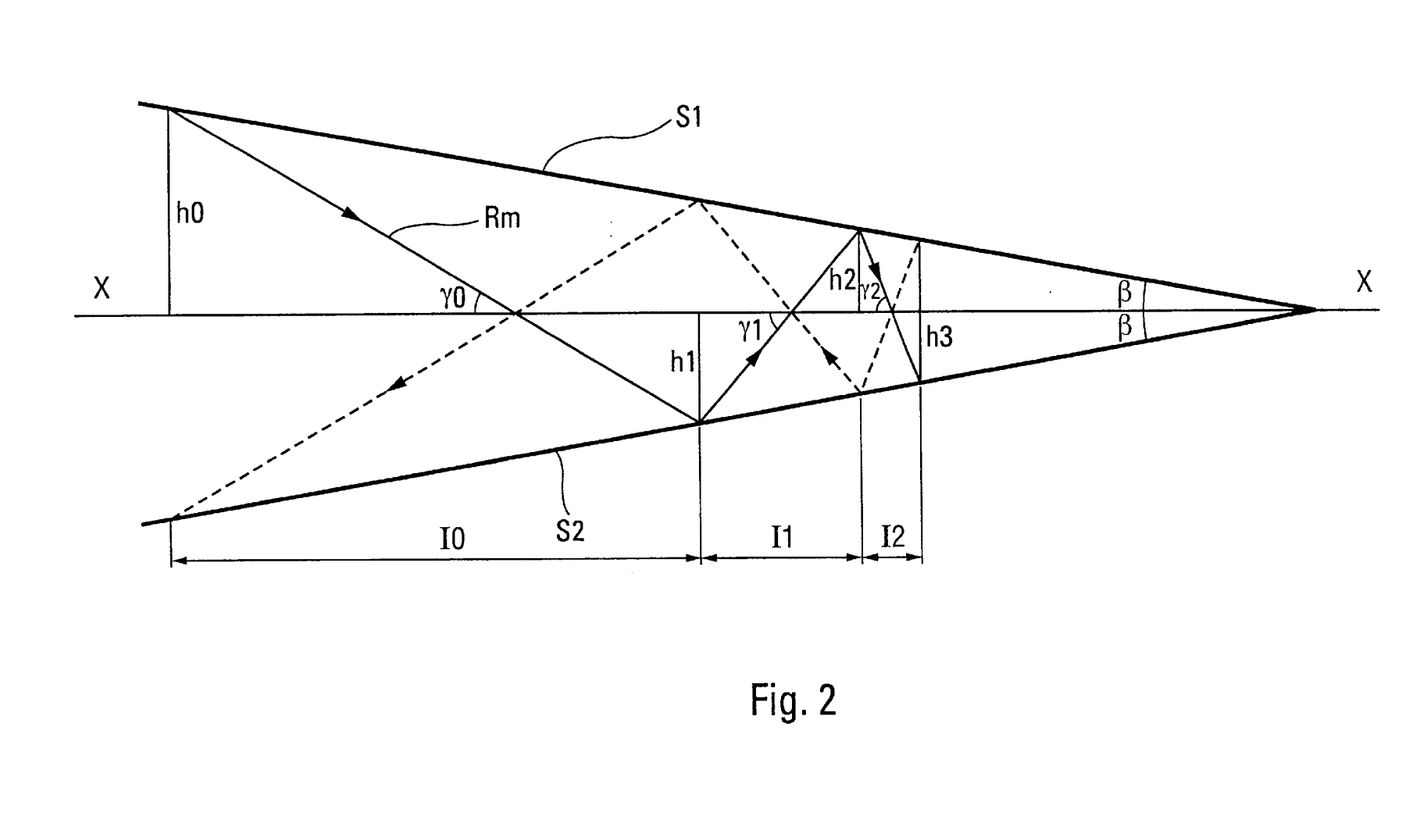
FIG. 2 shows schematically the path of a mean pump ray with a symmetric return in the laser source illustrated in FIG. 1.

For this purpose, in order to demonstrate the characteristics making it possible, in particular, to determine the appropriate dimensions of the optical elements 5 and 6, reference may be made to FIG. 2 which shows a simplified representation of the dihedron formed by the reflection faces S1 and S2 and acting as a guide for the pump beam. These reflection faces S1, S2 make an angle $2\beta$ with each other.

The mean ray Rm coming from the center of the pump source 3 and propagating in a plane orthogonal to the edge of the dihedron will be taken as a reference. It is assumed that after n reflections have successively taken place, this ray Rm returns in the opposite direction following a return path which is symmetrical to the outward path. In FIG. 2, n is equal to 3. This reference ray Rm intercepts one face of the dihedron at a height h0 with respect to the X—X axis of symmetry and makes an angle $\gamma 0$ with this same axis.

The terms h0, $\gamma 0$, n and $\beta$ are the input parameters characterizing the propagation of the average ray Rm in the pump beam guide.

During a reflection, the ray Rm rotates through an angle $2(\gamma n-1+\beta)$, $\gamma n-1$ being the angle between the ray Rm and the X—X axis before the $n^{th}$ reflection. This corresponds to an increase of $2\beta$ in the angle $\gamma n-1$ after reflection. Therefore:

$$\gamma n = \gamma n-1 + 2\beta,$$

where $\gamma n$ is the angle between the ray Rm and the X—X axis after the $n^{th}$ reflection.

Alternatively, by recurrence:

$$\gamma n = \gamma 0 + 2n\beta \quad (1)$$

When the return is symmetrical, the angle $\gamma nr$ after the last reflection is a right angle. Then:

$$\gamma nr = \pi/2 = \gamma 0 + 2nr\beta,$$

where nr is the number of reflections before return.

The following simple equation is then established:

$$\gamma 0 = \pi/2 - 2nr\beta \quad (2)$$

The number nr of reflections before return is a parameter imposed by the total length of material of the rod 2 through which the pump beam F1, F2 has to pass in order to be completely absorbed. Once this number nr is fixed, it is desired to know the dimensions that need to be given to the laser source 1 given the size of the pump sources 3, 4 and of the doped part.

Using FIG. 2, some recurrence equations are easily established. Let In be the distance along the X—X axis between two successive reflections n and n+1, such that:

$\tan\gamma n = (hn+\delta)/\ln$ and $\tan\beta = (hn-\delta)/\ln$, where $\delta = hn+1$ from which:

$\ln = 2hn/[\tan(\gamma 0+2n\beta)+\tan\beta]$ $hn+1 = \delta = hn - \ln \tan\beta$ or alternatively:

$hn+1 = hn\{[\tan(\gamma 0+2n\beta)-\tan\beta]/[\tan(\gamma 0+2n\beta)+\tan\beta]\}$ By successive applications of these formulae the total pump length can be calculated, and also the aperture at the end of the guide.

Moreover, in order to evaluate the path of a marginal offset ray R1, it is necessary to produce a lateral offset with respect to said mean ray Rm, therefore without changing the angle $\gamma n$.

Figure 3:
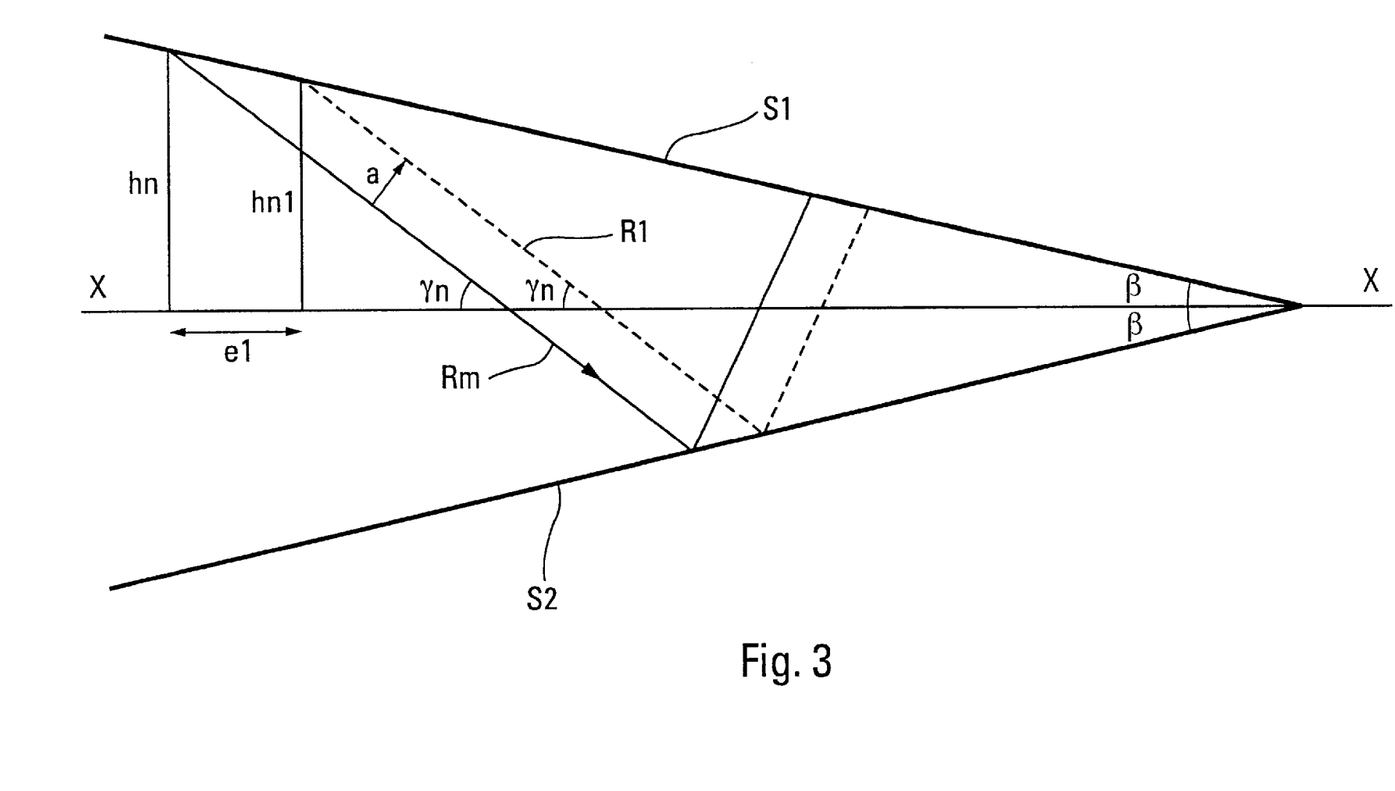
FIG. 3 shows schematically the path of a pump ray which is offset laterally with respect to a mean pump ray in the laser source illustrated in FIG. 1.

A positive offset a with respect to the mean ray Rm (i.e. whose projection on the X—X axis is in the propagation direction of the mean ray Rm) is assumed, as shown in FIG. 3.

The term hn1 denotes the height, bearing on the X—X axis of the intersection of the new ray R1 with the face S1 of the dihedron. This leads to the following equation:

$$a/\sin(\gamma n-\beta) = (hn-hn1)/\sin\beta$$

that is:

$$hn1 = hn - a\,\sin\beta/\sin(\gamma n-\beta)$$

Generally, this offset is carried out at the first incident ray and it therefore relates to the height h0. Once h0 is converted to h01, the recurrence equations are applicable to h01.

The displacement e1 along the X—X axis, of the intersection of the ray with the dihedron is obtained from the equation:

$$e1/\cos\beta = a/\sin(\gamma n-\beta)$$

or else:

$$e1 = a\,\cos\beta/\sin(\gamma n-\beta)$$

Figure 4:
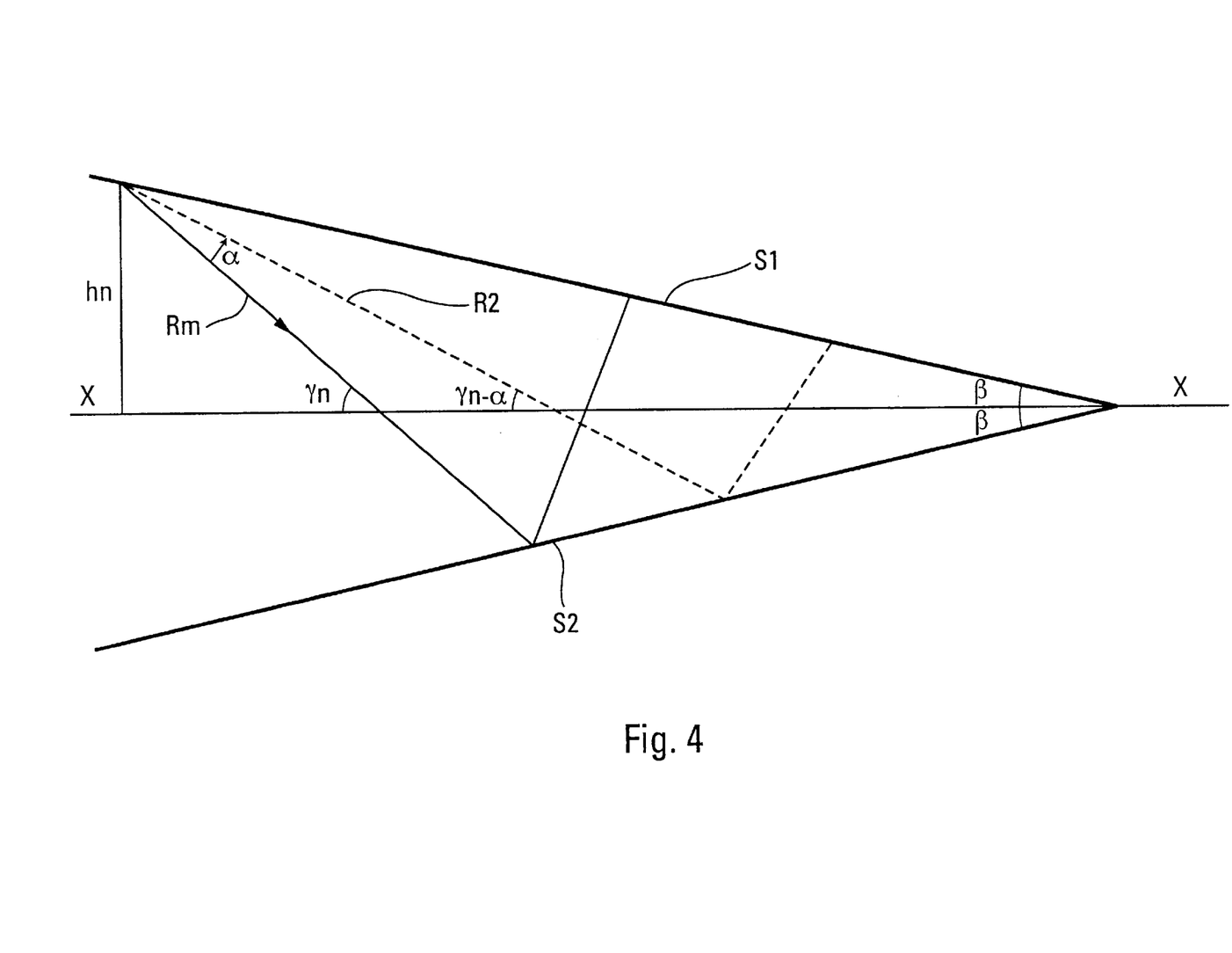
FIG. 4 shows schematically the path of a mean pump ray which is offset by angle with respect to a mean pump ray in the laser source illustrated in FIG. 1.

Moreover, instead of having a lateral offset, as shown in FIG. 3, a marginal pump ray R2 may also have an angular deviation $\alpha$, with respect to said mean ray Rm at a height hn, as shown in FIG. 4.

In this case, the aforementioned recurrence formulae remain applicable provided $\gamma n$ is changed to $(\gamma n+\alpha)$, if the rotation is carried out in the anticlockwise direction, and to $(\gamma n-\alpha)$ if it is changed in the opposite direction.

When the angular deviation is applied to the first incident ray and if $\alpha < \beta$, the ray R2 will have the same number of reflections before return.

Moreover, if the reference ray has a symmetrical configuration, the returning ray corresponding to the deviated ray R2 will make an angle $\gamma nr=\pi/2\pm\alpha$ with the X—X axis. The angular offset $\alpha$ with respect to the mean ray Rm is maintained throughout the propagation of the ray R2, in particular during the return.

Moreover, the width d of the input face 5B, 6B of the optical element 5, 6, i.e. the width of the input window of the pump beam F1, F2, is determined from the dimensions of the pump source 3, 4, said width d being slightly greater in order to prevent any risk of stopping down said pump beam.

Figure 5:
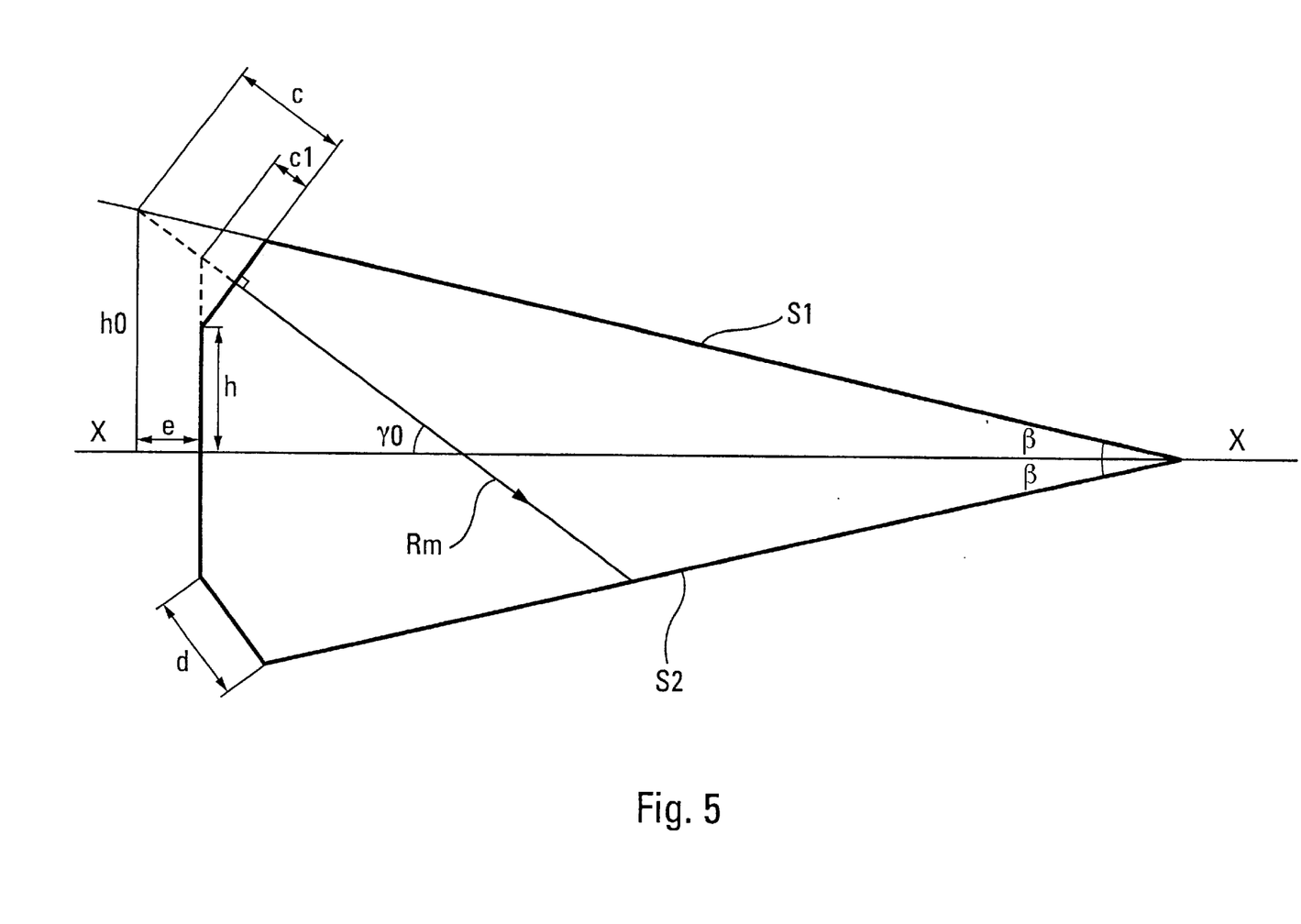
FIG. 5 is a diagram which allows the input faces of the laser source illustrated in FIG. 1 to be defined.

Since this width d is symmetrically distributed on both sides of the mean reference ray Rm, it is possible to determine the distance e between the reference plane containing h0 and the input end of the prismatic guide, as shown in FIG. 5. The lengths c and c1 which are shown in this FIG. 5 lead to the following equations:

$$c=d/[2 \tan(\gamma 0-\beta)] \text{ and } c1=[d \tan \gamma 0]/2$$

Moreover, since:

$$e=(c-c1) \cos \gamma 0,$$

we finish with the equation:

$$e=(d \cos\gamma 0)/2[\tan^{-1}(\gamma 0-\beta)-\tan\gamma 0]$$

Moreover, the height h between the end of the input face 5B and the X—X axis of the dihedron (FIG. 5) may be calculated from the equation:

$$h=h0-c \sin\gamma 0-(d \cos\gamma 0)/2$$

that is:

$$h=h0-(d \cos\gamma 0)/2 [\tan\gamma 0 \tan^{-1}(\gamma 0-\beta)+1]$$

Figure 6:
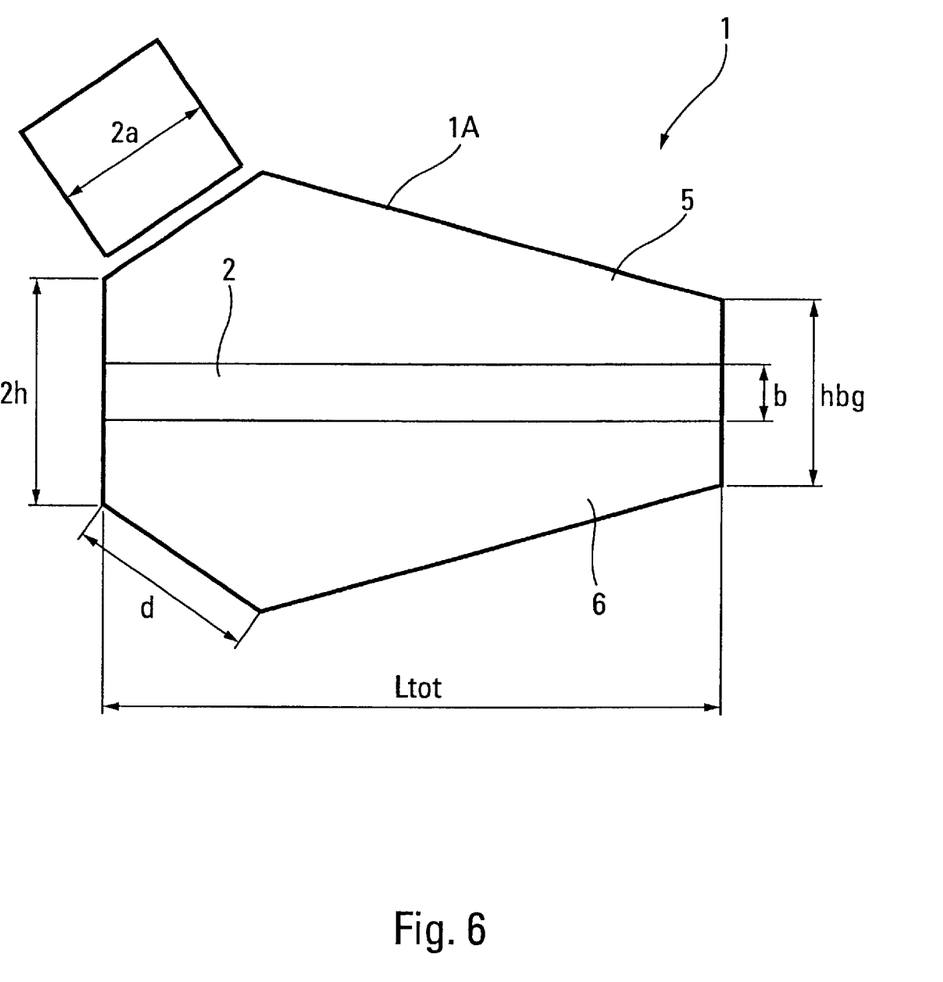
FIG. 6 is a diagram illustrating the external dimensions of the laser source shown in FIG. 1.

The dimensions of the two different embodiments of the laser source 1 in accordance with the invention will be specified below, with reference to FIG. 6, i.e.:
first, an oscillator; and
secondly, an amplifier.

With respect to the oscillator, the following input parameters are chosen:
dimension of the input face: d=12 mm;
dimension of the pump beam F1, F2: 2$a$=10.2 mm;
height of the mean reference ray Rm with respect to the X—X axis: h0=18 mm;
angle of incidence of the mean ray with respect to the X—X axis: $\gamma 0$=38°;
number of reflections in the symmetrical situation for the mean ray Rm: n=2.

Using the above equation (2), gives $\beta$=13°.
Using the above equation (1), gives $\gamma 1$=64° and $y2$=90°.

The mean reference ray Rm from a pump source 3 therefore passes five times through the amplifying medium before returning to the opposite pump source 4. If b is the transverse dimension of the doped material of the rod 2, the total thickness btot of the active medium through which the mean reference ray Rm passes is:

$$btot=2b/\sin\gamma 0+2b/\sin\gamma 1+b$$

In the example considered here: btot=32.4 mm.
The other parameters for the mean ray Rm are as follows:
I0=35.57 mm;
h1=9.79 mm;
I1=8.58 mm;
h2=7.81 mm;
e=6.45 mm;
h=5.35 mm.

In order to determine the total length Ltot of the active element 1A, the propagation of the marginal ray furthest from the X—X axis and the above recurrence equations have to be taken into account.

The following is then obtained in the usual manner:
Ltot=54.8 mm.

In addition, the dimension hbg at the opposite end to the input faces of the active element 1A measures 7.72 mm.

Secondly, with reference to the example of an amplifier, the following input parameters are taken:
d=28 mm;
2$a$=23 mm;
h0=40 mm;
$\gamma 0$=38°;
n=2;
b=7 mm;
from which the following are calculated:
$\beta$=13°;
$\gamma 1$=64°;
$y2$=90°;
btot=45.3 mm.

Figure 7:
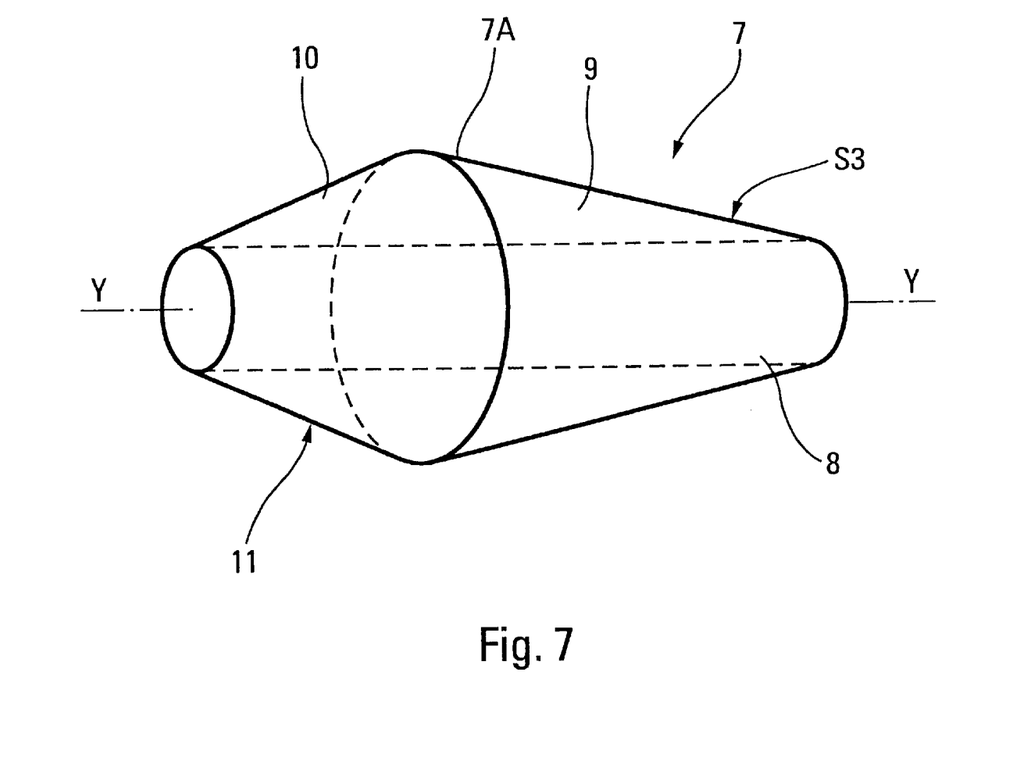
FIGS. 7 and 8 illustrate schematically a laser source according to second and third embodiments of the invention, respectively.

Moreover, the following is obtained:

In a second embodiment shown in FIG. 7, the laser source 7 comprises an active element 7A which includes:
an elongate rod 8, of circular cross section and with axis Y—Y; and
an optical element comprising two conical sections 9 and 10 which form a single piece, which are coaxial with the Y—Y axis and which define conical surfaces S3 and 11, respectively. The conical surface 11 acts as input face for a pump beam (not shown).

Note that, in this case, each of the at least two interacting reflection faces is rounded and forms a part (not shown) of the conical surface S3 of said conical section 9.

Figure 8:
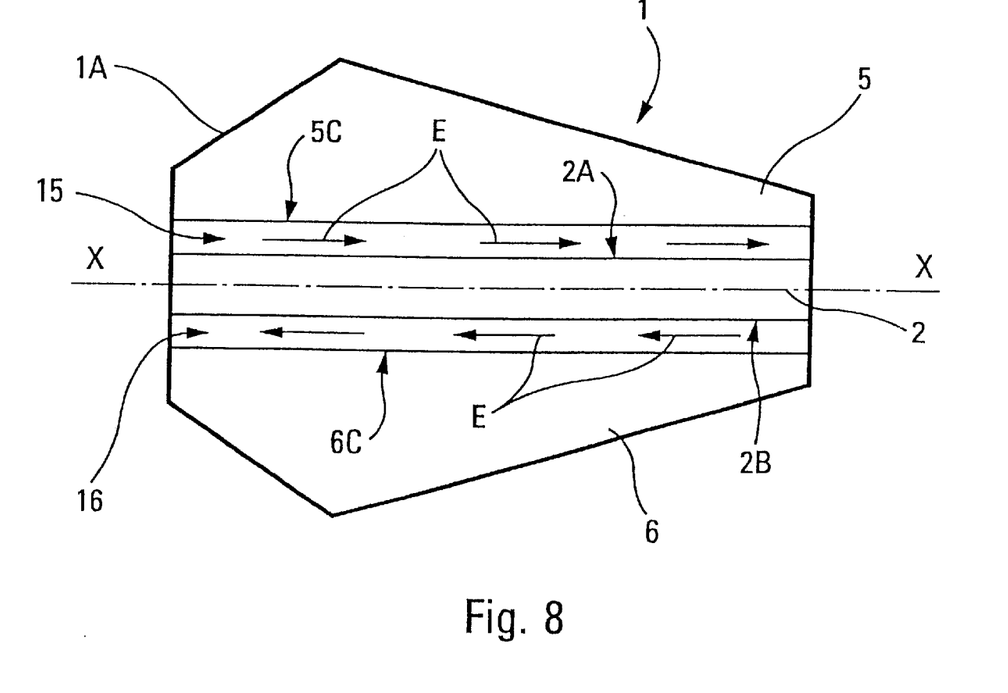

Moreover, FIG. 8 shows a particular variant of the embodiment 1A of FIG. 1. In this variant, the optical elements 5 and 6 are not provided directly on the faces 2A and 2B of the rod 2, but said active element 1A includes passages 15 and 16 between said faces 2A and 2B and faces 5C and 6C respectively of said optical elements 5 and 6, which are opposite to them. These passages 15 and 16 are combined with means which are known but not shown, which generate a flow of coolant, as illustrated by arrows E in said passages 15 and 16.

Although this has not been expressly mentioned, it will be noted that all the particular characteristics (for example the type of material) of said first embodiment 1A of FIG. 1, which are applicable to at least one of said second and third embodiments respectively of FIGS. 7 and 8, are part of the present invention in combination with the particular suitable embodiment(s).

What is claimed is:
1. A laser source comprising:
an active element for a laser source, said active element comprising an optical block which includes:
an elongate rod, which comprises a doped matrix for absorbing a pump beam in order to amplify laser radiation propagating longitudinally along a longitudinal axis of the elongate rod;

optical elements, which include a material having substantially the same optical index as said doped matrix, which are fixed respectively to faces of said rod, each of said optical elements having at least one input face for receiving the pump beam, the input face of each of said optical elements being formed at an inclined angle with respect to the longitudinal axis of the rod; and at least two reflection faces which interact with each other and the pump beam, at least one of the at least two reflection faces being formed at an inclined angle, with respect to the longitudinal axis of the rod, with an inclination direction opposite to that of said input face of a corresponding first one of said optical elements; and at least one pump source operable to emit a pump beam into said active element.

2. The laser source as claimed in claim 1, wherein the pump source has an emission surface for the pump beam, the width of which is smaller, by a predefined margin, than the width of said input face of each of the optical elements of the active element.

3. An active element for a laser source, said active element comprising an optical block which includes:

an elongate rod, which comprises a doped matrix for absorbing a pump beam in order to amplify laser radiation propagating longitudinally along a longitudinal axis of the elongate rod;

optical elements, which include a material having substantially the same optical index as said doped matrix, which are fixed respectively to faces of said rod, each of said optical elements having at least one input face for receiving the pump beam, the input face of each of said optical elements being formed at an inclined angle with respect to the longitudinal axis of the rod; and at least two reflection faces which interact with each other and the pump beam, at least one of the at least two reflection faces being formed at an inclined angle, with respect to the longitudinal axis of the rod, with an inclination direction opposite to that of said input face of a corresponding first one of said optical elements.

4. The active element as claimed in claim 3, wherein said rod has a rectangular cross section and said first one of said reflection faces is a component of said first one of said optical elements.

5. The active element as claimed in claim 4, wherein:

a second one of said at least two reflection faces is formed at an inclined angle, with respect to the longitudinal axis, with an inclination direction opposite to that of said input face of a corresponding second one of the optical elements; and said second reflection face is a component of said second one of said optical elements.

6. The active element as claimed in claim 5, wherein said first and second optical elements are identical and are symmetrically fixed to said rod.

7. The active element as claimed in claim 4, wherein said second reflection face is directly formed on one face of said rod.

8. The active element as claimed in claim 4, wherein at least one optical element is doped.

9. The active element as claimed in claim 4, wherein at least one optical element is made from at least one of the following materials: yttrium aluminum garnet, vanadate, glass or sapphire.

10. The active element as claimed in claim 4, wherein at least one optical element is fixed by diffusion bonding to said rod.

11. The active element as claimed in claim 3, wherein said rod has a circular cross section.

12. The active element as claimed in claim 3, wherein said at least two reflection faces are flat.

13. The active element as claimed in claim 3, wherein said at least two reflection faces are rounded.

14. The active element as claimed in claim 13, wherein each of said at least two reflection faces forms a part of a conical surface of a first conical section of a respective one of the optical elements.

15. The active element as claimed in claim 14, wherein said optical elements comprise a second conical section having a conical surface, wherein said first and second conical sections coaxially surround said rod and are made from a material having substantially the same optical index as the matrix of said rod, and wherein the conical surface of said second conical section comprises said input face of each of said optical elements.

16. The active element as claimed in claim 3, wherein said input face of said first optical element is provided with an antireflection coating.

17. The active element as claimed in claim 3, further comprising a means for generating a flow of coolant directly over at least one face of said rod.

* * * * *